(12) United States Patent
Kim et al.

(10) Patent No.: US 10,459,177 B2
(45) Date of Patent: Oct. 29, 2019

(54) OPTICAL ALIGNMENT DEVICE AND OPTICAL ALIGNMENT METHOD

(71) Applicant: Electronics and Telecommunications Research Institute, Daejeon (KR)

(72) Inventors: Jeong Eun Kim, Gwangju (KR); Jong Jin Lee, Gwangju (KR); Eun Kyu Kang, Gwangju (KR); Won Bae Kwon, Gwangju (KR); Soo Yong Jung, Gwangju (KR)

(73) Assignee: ELECTRONICS AND TELECOMMUNICATIONS REASEARCH INSTITUTE, Daejeon (KR)

( * ) Notice: Subject to any disclaimer, the term of this patent is extended or adjusted under 35 U.S.C. 154(b) by 12 days.

(21) Appl. No.: 15/807,784

(22) Filed: Nov. 9, 2017

(65) Prior Publication Data
US 2019/0033540 A1 Jan. 31, 2019

(30) Foreign Application Priority Data
Jul. 28, 2017 (KR) ........................ 10-2017-0096193

(51) Int. Cl.
*G02B 6/42* (2006.01)
*G02B 6/12* (2006.01)

(52) U.S. Cl.
CPC ......... *G02B 6/4225* (2013.01); *G02B 6/4221* (2013.01); *G02B 6/4227* (2013.01); *G02B 6/4249* (2013.01); *G02B 6/12009* (2013.01)

(58) Field of Classification Search
CPC ... G02B 6/4225; G02B 6/4227; G02B 6/4249
See application file for complete search history.

(56) References Cited

U.S. PATENT DOCUMENTS

| 5,631,991 A * | 5/1997 | Cohen ................. G02B 6/4204 385/93 |
| 2010/0067848 A1 | 3/2010 | Hwang et al. |
| 2011/0085763 A1 | 4/2011 | Baugh |
| 2013/0129281 A1 | 5/2013 | Son et al. |
| 2015/0139666 A1 | 5/2015 | Lee et al. |

(Continued)

FOREIGN PATENT DOCUMENTS

| KR | 1998-046378 | 9/1998 |
| KR | 10-2010-0031895 | 3/2010 |

(Continued)

*Primary Examiner* — John Bedtelyon
(74) *Attorney, Agent, or Firm* — Kile Park Reed & Houtteman PLLC

(57) ABSTRACT

Provided are an optical alignment device applied to an assembly process of an optical transmitter and an optical receiver that include multi-channel optical elements and optical waveguide elements for optical communication, and an optical alignment method thereof. The optical alignment device includes an element fixing case with a mounting space formed thereinside and an element insertion hole communicating with the mounting space formed at an upper side thereof, and a light source mounted in the mounting space of the element fixing case and configured to emit light toward a lower side of an optical element or an optical waveguide element which is inserted into the element insertion hole to check a position of a core.

16 Claims, 8 Drawing Sheets

(56) References Cited

U.S. PATENT DOCUMENTS

2015/0372759 A1 12/2015 Lim et al.
2015/0378114 A1 12/2015 Son et al.
2016/0246014 A1 8/2016 Son et al.
2017/0205593 A1 7/2017 Son et al.

FOREIGN PATENT DOCUMENTS

| KR | 10-2011-0070909 | 6/2011 |
| KR | 10-2012-0029673 | 3/2012 |
| KR | 10-1480025 | 1/2015 |

* cited by examiner

OPTICAL ALIGNMENT DEVICE AND OPTICAL ALIGNMENT METHOD

CROSS-REFERENCE TO RELATED APPLICATION

This application claims priority to and the benefit of Korean Patent Application No. 10-2017-0096193, filed on Jul. 28, 2017, the disclosure of which is incorporated herein by reference in its entirety.

BACKGROUND

1. Field of the Invention

The present invention relates to an optical alignment device applied to an assembly process of an optical transmitter and an optical receiver that include multi-channel optical elements for optical communication (a light source element and a light receiving element) and optical waveguide elements (an optical combining element and an optical splitting element), and an optical alignment method thereof, and more particularly, to an optical alignment device capable of performing position alignment after recognizing a position of a core of an optical element or optical waveguide element, and an optical alignment method thereof.

2. Discussion of Related Art

With an increase in the amount of data being sent in optical communication, there has been a recent trend toward adopting wavelength division multiplexing (WDM).

FIG. 1 is a conceptual diagram illustrating an optical communication in a WDM scheme. Generally, an optical transmitter used in general WDM optical communication includes multiple light source elements (laser diodes (LD)) having different wavelengths and an optical combining element (Multiplexer: Mux) configured to multiplexes the different wavelengths to a single output channel to transmit the multiplexed signal over a single optical fiber. The optical receiver includes an optical splitting element (Demultiplexer: Demux) for splitting a signal transmitted over a single optical fiber according to wavelengths and multiple light receiving elements (photo detectors: PDs).

FIG. 2 illustrates a planar waveguide-based optical combining/splitting element which is applied to an optical transmitter and an optical detector according to a conventional technology in which a core having a high refractive index is surrounded by a cladding having a relatively low refractive index and a difference in refractive index between the core and the cladding causes light to be guided only along a path of the core.

In addition, since performances of the optical transmitter and the optical receiver are determined by an optical output power of the optical transmitter and a reception sensitivity of the optical receiver, maximizing optical coupling efficiency between an optical element and an optical waveguide element is a key issue.

As a conventional optical alignment method for maximizing optical coupling efficiency methods of aligning optical elements with an optical waveguide element in a passive manner and in an active manner exist. Passive alignment is a method implemented by bonding light source elements/light receiving elements to predetermined alignment positions when the light source elements/light receiving elements are not supplied with power. Active alignment is a method implemented by finding optimal optical coupling positions of light source elements/light receiving elements when the light source/light receiving elements are supplied with power and emit and receive light, thereby assembling the light source elements/light receiving elements at the found positions.

As such, the passive alignment method ensures an easy optical alignment and shortens a time for an optical assembly process but positions of an optical waveguide and optical input/output ports deviate from predetermined alignment positions thereof due to a process error occurring in a manufacturing process, thereby resulting in a low optical alignment precision.

In comparison, the active alignment method enhances optical coupling efficiency but needs to apply a power to the light source elements/light detector elements and requires a long period of time for the optical alignment process and high-priced alignment equipment.

In order to reduce these limitations, an optical transmitter, and an optical receiver for passive alignment of parts, and a method for passive alignment of parts (Korean Registered Patent No. 10-1176950) (hereinafter, referred to as "related art 1") have been suggested, in which FIG. 3 illustrates an optical module structure capable of passively aligning a multi-channel light emitting or light detecting element 111, which are mounted on a substrate 110, with an optical fiber 13.

According to the related art 1, a lens optical fiber connecting part 120 is obtained by forming a single structure including a focal lens 123 collecting and guiding light, a prism 122 changing a direction of travelling light, and an optical fiber connector 121 fixing and aligning optical fibers 133, and the lens optical fiber connecting part 120 is inserted into an alignment reference part 115 that is fitted into a substrate hole 114 such that a passive alignment is achieved.

However, as for a single mode, a size of an optical fiber core or a cross section of a waveguide of an optical combiner/splitter is as small as several micrometers. In this case, the passive optical alignment requires components to be processed at a high precision for minimizing mechanical errors of the components to enhance optical coupling efficiency between elements. Accordingly, a processing cost is increased, and even with high processing precision, it is difficult to achieve a desired precision through only passive alignment.

In order to reduce these limitations, an active and passive optical alignment method, and an optical element packing system, and an optical module using the method (Korean Registered Patent No. 10-0978307) (hereinafter, referred to as "related art 2") has been suggested, in which an external light source is emitted toward an optical waveguide provided with a reflective mirror to visualize an optical path such that an optical element and an optical path are easily aligned with each other.

However, in the related art 2, in order to shift the optical path upward, there is a need to additionally manufacture a reflective structure which serves as a mirror by having at least one side surface of the optical waveguide angled, thus it is not cost efficient and not easily applicable to an optical combining and splitting element which have a light emitting surface and a light receiving surface formed on sides thereof.

RELATED ART DOCUMENT

Patent Document (Patent Document 1): Korean Registered Patent No. 10-1176950

(Patent Document 2): Korean Registered Patent No. 10-0978307

SUMMARY OF THE INVENTION

The present invention is directed to provide an optical alignment device capable of aligning an optical element or an optical waveguide element while checking positions of a core of the optical element or the optical waveguide element by using a light source without applying power to the optical element or the optical waveguide element, and an optical alignment method thereof.

The technical objectives of the present invention are not limited to the above disclosure, and other objectives may become apparent to those of ordinary skill in the art based on the following descriptions.

To achieve the above-described objectives, an optical alignment device according to an aspect of the present invention includes: an element fixing case having a mounting space formed thereinside and an element insertion hole communicating with the mounting space formed at an upper side thereof; and a light source mounted in the mounting space of the element fixing case and configured to emit light to a lower side of an optical element or an optical waveguide element which is inserted into the element insertion hole to check a position of a core.

A fixing case support part having a plate shape may be provided at a lower portion of the element fixing case.

An opening may be formed at a front surface of the element fixing case, and a display window formed of a transparent or semi-transparent material may be selectively mounted in the opening.

A depth limiting part configured to limit an insertion depth of the optical element or the optical waveguide element may be formed inside the element fixing case.

The optical alignment device may further include a medium coated part formed at a lower portion of the depth limiting part and coated with a medium for absorbing reflected light and scattered light.

The light source may use light in a visible light range.

The light source may be mounted in the mounting space of the element fixing case as a fixed type light source or a movable type light source.

The light source may obliquely emit light toward the lower side of the optical element or the optical waveguide element.

The light source configured to supply power to the optical alignment device may include an external light source configured to supply light in a visible light range, an emitter obliquely mounted in the element fixing case, and an optical fiber patch cable connecting the external light source to the emitter.

A plurality of the optical alignment devices may be provided.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above and other advantages and a scheme for the advantages of the present invention will become readily apparent with reference to the following detailed description when considered in conjunction with the accompanying drawings. However, the scope of the present invention is not limited to such embodiments, and the present invention may be realized in various forms. The embodiments to be described below are nothing but embodiments provided to complete the disclosure of the present invention and assist those skilled in the art to completely understand the present invention. The present invention is defined only by the scope of the appended claims. Meanwhile, the terms used herein are used to aid in the explanation and understanding of the present invention and are not intended to limit the scope spirit of the present invention. It should be understood that the singular forms "a," "an," and "the" include plural references unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Figure 1:
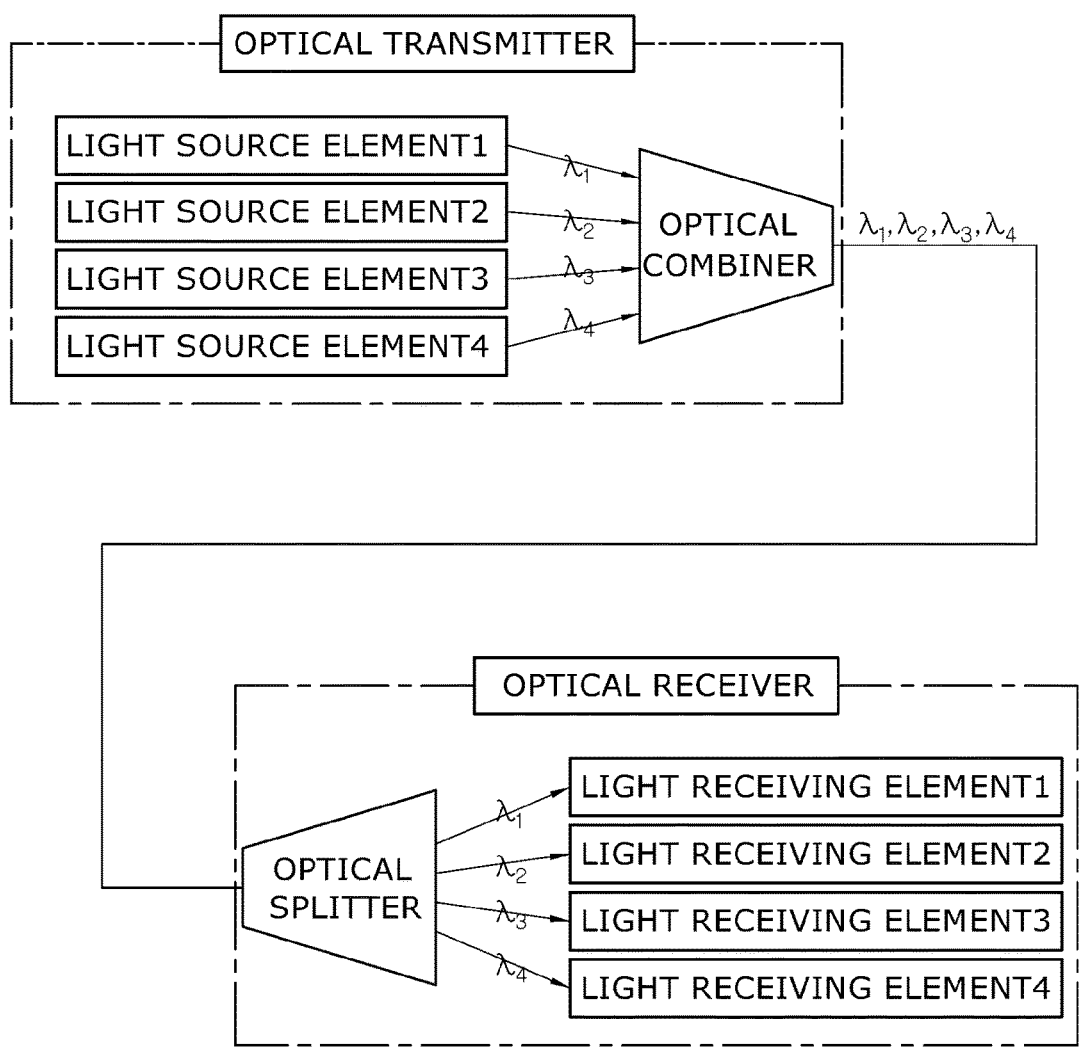
FIG. 1 is a conceptual diagram of an optical communication in a wavelength division multiplexing (WDM) scheme.
Figure 2:
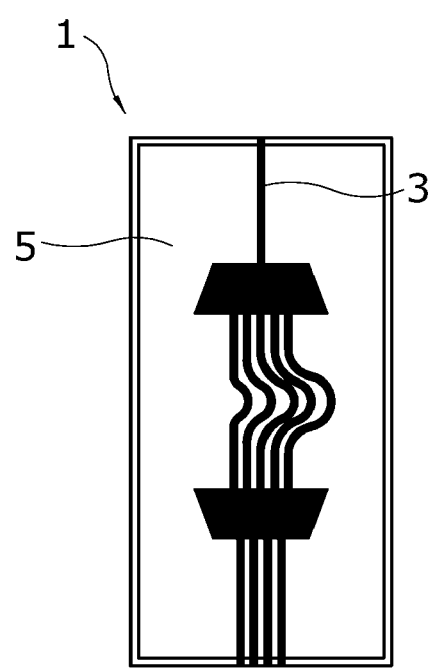
FIG. 2 is a view illustrating a planar waveguide-based optical combiner and splitter element which is applied to an optical transmitter and an optical detector according to a conventional technology.
Figure 3:
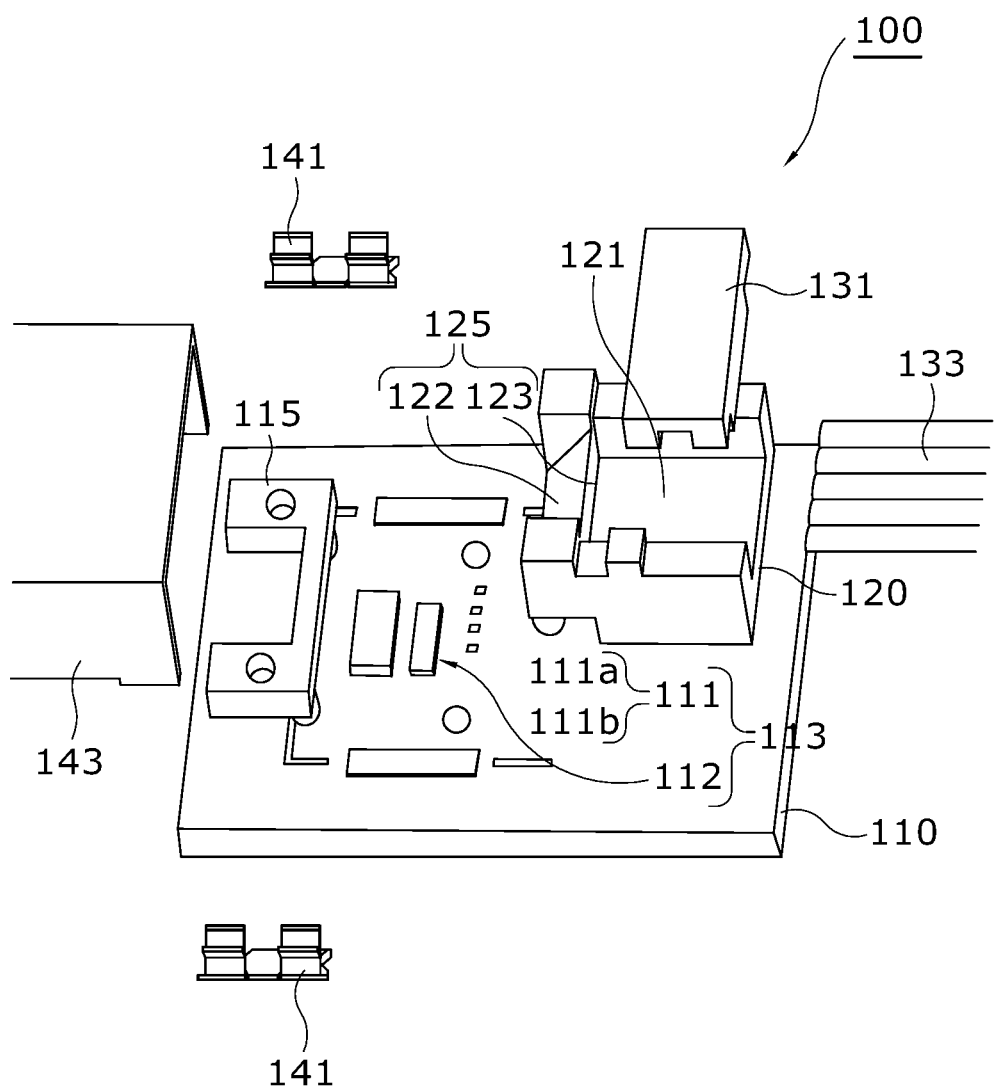
FIG. 3 is a view illustrating a method of passively aligning an optical transceiver device and components according to the conventional technology.
Figure 4:
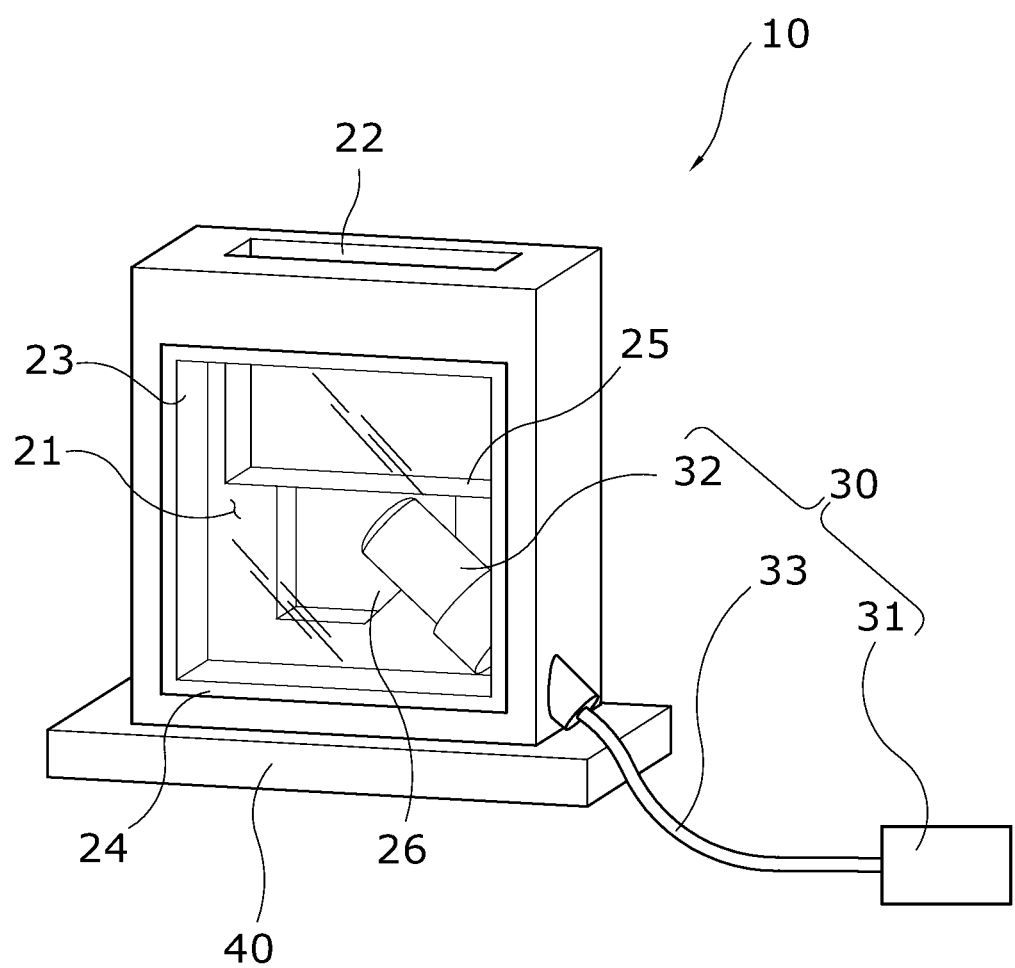
FIG. 4 is a perspective view illustrating an optical alignment device according to the present invention.
Figure 5:
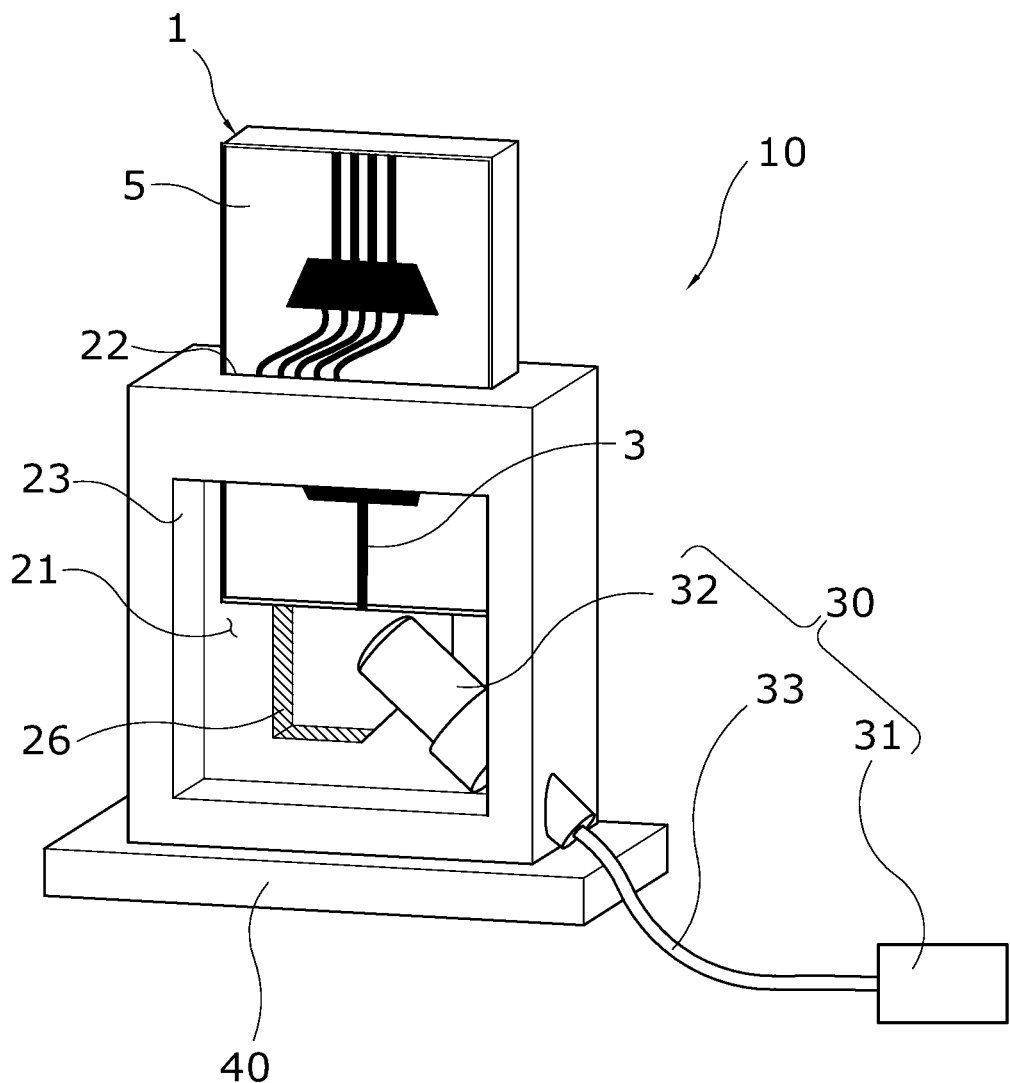
FIG. 5 is a perspective view illustrating an in-use view of the optical alignment device according to the present invention without a display window.
Figure 6:
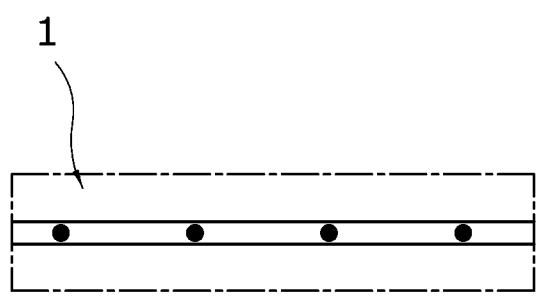
FIG. 6 is a plan view illustrating an optical element or an optical waveguide element when the optical alignment device shown in FIG. 5 is operated.
Figure 7:
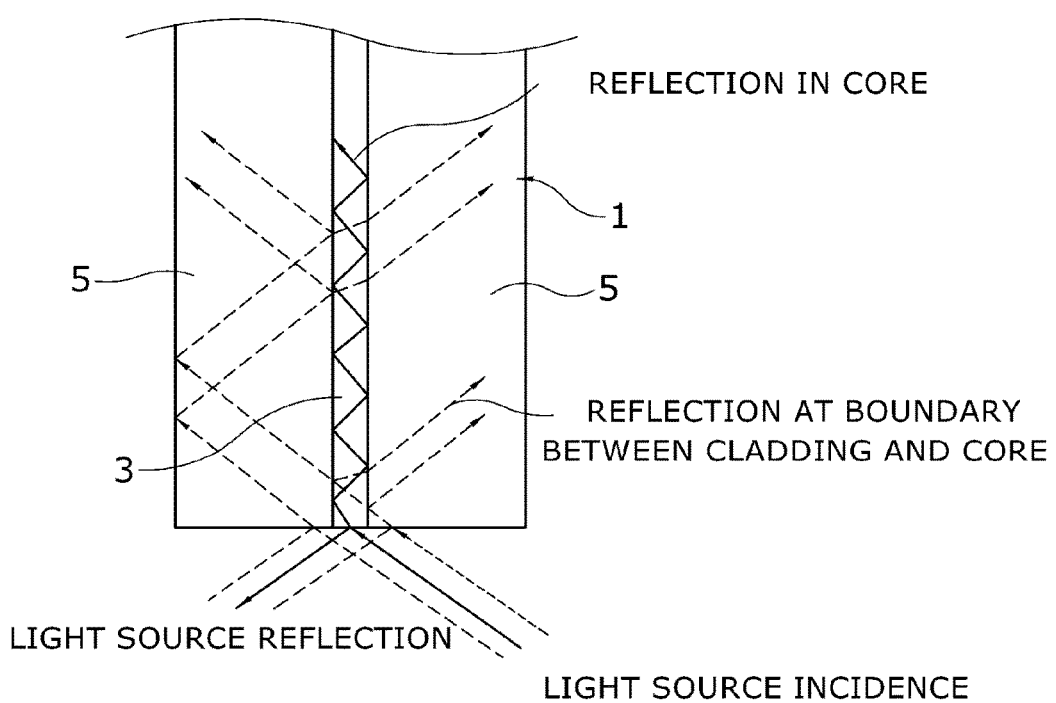
FIG. 7 is a conceptual diagram of an optical waveguide simulation in an optical element or an optical waveguide element when the optical alignment device according to the present invention is operated.

Hereinafter, an exemplary embodiment of the present invention will be described in detail with reference to the accompanying drawings. FIG. 4 is a perspective view illustrating an optical alignment device according to the present invention.

An optical alignment device 10 according to the present invention includes an element fixing case 20 into or from which an optical element 1 or an optical waveguide element is inserted or withdrawn and a light source 30 configured to emit light toward the optical element 1 or the optical waveguide element inserted into the element fixing case 20.

A fixing case support part 40 having a plate shape may be further mounted on a lower portion of the element fixing case 20.

That is, the fixing case support part 40 has a plate shape with a predetermined thickness and a predetermined size with an area larger than that of the element fixing case 20 such that the fixing case support part 40 may stably support a lower side of the element fixing case 20.

In this case, a slip prevention pad or a slip prevention protrusion (not shown) may be selectively installed on a bottom surface of the fixing case support part 40 such that the fixing case support part 40 comes into close contact with the ground.

The element fixing case 20 has a predetermined size that allows the light source 30 and the optical element 1 or the optical waveguide element to be mounted thereon.

The element fixing case 20 may be provided in various shapes according to environments and intended applications thereof, and the present invention illustrates the element fixing case 20 in a rectangular shape as an example.

A mounting space 21 is formed inside the element fixing case 20, and an element insertion hole 22 communicating with the mounting space 21 is formed at an upper side of the element fixing case 20.

That is, the element fixing case 20 has the mounting space 21 formed inside thereof to accommodate a portion of the light source 30 and a portion of the optical element 1 or the optical waveguide element, and has the element insertion hole 22 formed at the upper side thereof to allow the optical element 1 or the optical waveguide element to be inserted thereinto.

The position of the element insertion hole 22 formed on the element fixing case 20 is not limited to the upper side of the element fixing case 20. For example, the element insertion hole 22 may be formed at a lateral side or a lower side of the element fixing case 20 according to environments or intended applications thereof.

In addition, an opening 23 is formed at a front surface of the element fixing case 20, and a display window 24 formed of a transparent material is mounted in the opening 23.

That is, the element fixing case 20 has the opening 23 formed at the front surface thereof such that an installation state and operation process of the light source 30 and the optical element 1 or the optical waveguide element are visible with the naked eye, and the display window 24 formed of a transparent material, such as a glass or acryl, is mounted in the opening 23.

In addition, a depth limiting part 25 that limits an insertion depth of the optical element 1 or the optical waveguide element is formed inside the element fixing case 20.

That is, the depth limiting part 25 of the element fixing case 20 is horizontally formed in the mounting space 21 such that a distance between the light source 30 and the optical element 1 or the optical waveguide element is maintained. In this case, a height of the depth limiting part 25 may vary according to a position of the light source 30.

A medium coated part 26 coated with a medium that absorbs reflected light and scattered light is further formed at a lower portion of the depth limiting part 25.

In detail, the medium coated part 26 is formed to have a predetermined size at a lower portion of the depth limiting part 25 to prevent a reduction in a difference in contrast between a core 3 and a cladding 5 of the optical element 1 or the optical waveguide element due to reflected light and scattered light generated in the mounting space 21 at a time of emission of the light source 30.

The light source 30 is mounted in the mounting space 21 of the element fixing case 20 and emits light toward the optical element 1 or the optical waveguide element inserted into the element insertion hole 22.

That is, the light source 30 is mounted in the mounting space 21 of the element fixing case 20, and emits light toward a lower side of the optical element 1 or the optical waveguide element which is inserted through the element insertion hole 22 and is supported by the depth limiting part 25 such that a position of the core 3 is checked.

The light source 30 emitting light toward the optical element 1 or the optical waveguide element uses light in a visible light range, and the light in the visible light range is viewed through a general camera.

Meanwhile, when a component configured to check a radiation position is provided using an infrared camera rather than a general camera, the light source 30 uses infrared radiation.

In addition, the light source 30 is provided as a fixed type light source to emit light at a predetermined angle or as a movable type light source allowing for angular adjustment depending on the optical element 1 or the optical waveguide element mounted in the mounting space 21 of the element fixing case 20.

When the light source 30 is provided as the movable type light source, the angle of the light source 30 may be directly adjusted not only by an operator, but also by a generally known angle adjustment bracket.

In addition, the light source 30 is vertically or obliquely mounted below the optical element 1 or the optical waveguide element. According to the present invention, the light source 30 may be obliquely mounted and cause a difference in contrast between the core 3 and the cladding 5 of the optical element 1 or the optical waveguide element.

The light source 30 may be implemented not only as a self-emission light source, but also a light source having an external power supply.

The light source 30 includes an external light source 31 supplying light in the visible light range, an emitter 32 obliquely mounted in the element fixing case 20, and an optical fiber patch cable 33 connecting the external light source 31 to the emitter 32.

That is, the light source 30 is provided such that light supplied from the external light source 31 is transmitted to the emitter 32 through the optical fiber patch cable 33, and the emitter 32 emits the light transmitted through the optical fiber patch cable 33 toward the lower side of the optical element 1 or the optical waveguide element.

Figure 8:
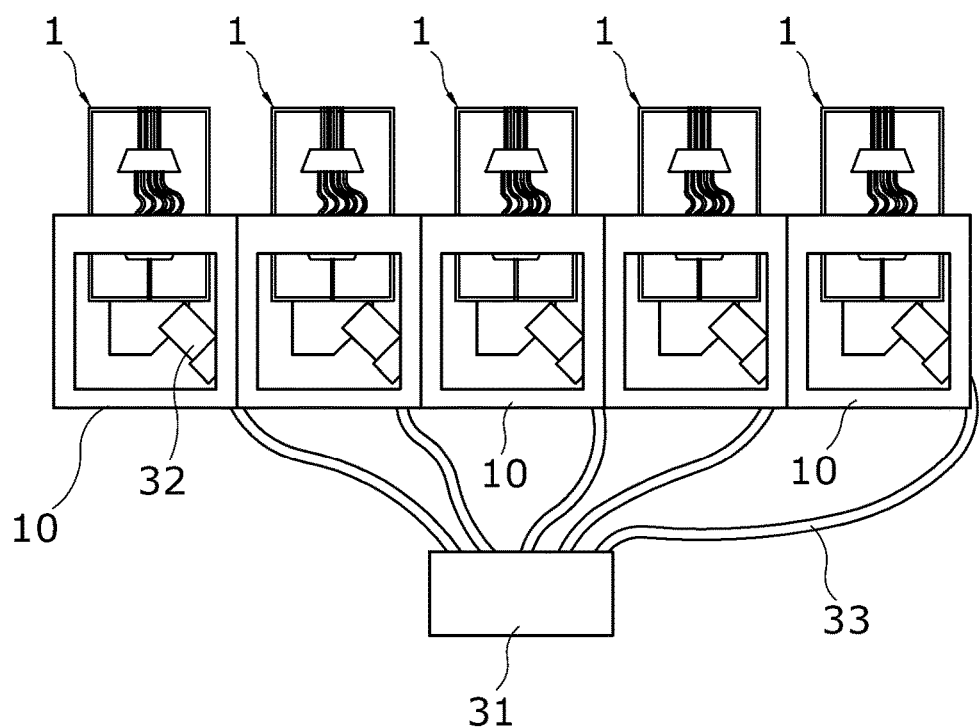
FIG. 8 is a view illustrating an optical alignment device according to another embodiment of the present invention.

Referring to FIG. 8, the optical alignment device 10 may include a plurality of optical alignment devices 10.

That is, a plurality of optical elements 1 or optical waveguide elements are simultaneously mounted on an array of the optical alignment devices 10, light sources 30 are simultaneously or sequentially turned on, and the plurality of optical elements 1 or optical waveguide elements are sequentially assembled with the array being moved.

In this case, each of the optical alignment devices 10 may be provided with an individual light source 30 or may receive light from a single light source 31.

Hereinafter, an embodiment of an optical alignment device having the above described construction and an optical alignment method thereof will be described.

First, the optical alignment method includes forming the element fixing case 20 which has a mounting space 21 formed thereinside, an element insertion hole 22 communicating with the mounting space 21 formed at an upper side of the element fixing case 20, an opening 23 at a front surface of the element fixing case 20, a display window 24 formed of a transparent material and installed in the opening 23, a depth limiting part 25 formed inside the element fixing case 20 to limit an insertion depth of an optical element 1 or an optical waveguide element, and a medium coated part 26 formed at a lower portion of the depth limiting part 25 and coated with a medium to absorb reflected light and scattered light.

Then, the optical alignment method includes mounting a light source 30, which includes an external light source 31 supplying light in a visible light range to the element fixing case 20, an emitter 32 mounted in the element fixing case 20, and an optical fiber patch cable 33 connecting the external light source 31 to the emitter 32, in the element fixing case 20, thereby completing assembly of the optical alignment device 10.

In this case, a fixing case support part 40 having a plate shape with a predetermined thickness and a predetermined size may be selectively mounted on a lower side of the element fixing case 20.

The process of assembling the optical alignment device may be executed in a different sequence from that of the above description. Hereinafter, a process of aligning an optical element or an optical waveguide element with the optical alignment device is described.

First, the optical element 1 or the optical waveguide element is inserted into the element insertion hole 22 of the element fixing case 20 until a lower end of the optical element 1 or the optical waveguide element makes contact with the depth limiting part 25.

Then, the emitter 32 of the light source 30 mounted on the element fixing case 20 is adjusted to be directed toward a core 3 of the optical element 1 or the optical waveguide element.

Then, power is supplied to the external light source 31 constituting the light source 30 so that light in the visible light range supplied from the external light source 31 is emitted toward a lower side of the optical element 1 or the optical waveguide element after sequentially passing through the optical fiber patch cable 33 and the emitter 32.

In this case, light incident on the core 3 of the optical element 1 or the optical waveguide element is guided into the core 3 and reflected in the core 3 without being transmitted through a cladding 5 from a boundary between the core 3 and the cladding 5.

Meanwhile, light incident on the cladding 5 of the optical element 1 or the optical waveguide element is transmitted through the cladding 5 from a boundary adjacent to the cladding 5 and is distributed over a large area of the cladding 5 in the reflection process. Accordingly, intensity of light guided in the cladding 5 is weaker than that of light incident on the core 3 and guided in the core 3.

As such, a difference in contrast between the core 3 and the cladding 5 of the optical element 1 or the optical waveguide element exist such that a position of the core 3 is easily identified.

Light transferred to the optical element 1 or the optical waveguide element via the emitter 32 and an operational state are viewed through the display window 24, and a position of the optical element 1 or the optical waveguide element or the emitter 32 may be adjusted when the position of the optical element 1 or the optical waveguide or the emitter 32 needs to be adjusted.

As should be apparent from the above, the position of the core of the optical element or the optical waveguide element can be precisely and rapidly recognized, the assembly process and the assembly process time thereof can be reduced, and mass production thereof can be ensured by light of the light source being emitted toward the optical element or the optical waveguide element mounted on the element fixing case at a predetermined angle.

In addition, an alignment error occurring in a passive alignment method by an optical alignment display according to a conventional technology can be minimized, and a time for the optical alignment process and the manufacturing cost can be saved.

The exemplary embodiments of the present invention are illustrative in purpose, and those skilled in the art should appreciate that various modifications, changes, and substitutions thereto are possible without departing from the scope and spirit of the invention.

Therefore, the exemplary embodiments disclosed in the present invention and the accompanying drawings are intended to illustrate and not limit the technical spirit of the present invention. The scope of the invention is set forth in the following claims rather than the above specification, and it is intended that the present invention covers all modifications provided they come within the scope of the appended claims and their equivalents.

What is claimed is:

1. An optical alignment device comprising:
    an element fixing case having a mounting space formed thereinside and an element insertion hole communicating with the mounting space formed at an upper side thereof into which an optical element or an optical waveguide element is inserted; and
    a light source obliquely mounted in the mounting space of the element fixing case, and configured to emit light toward a lower side of the optical element or the optical waveguide element,
    wherein the optical alignment device checks a position of a core of the optical element or the optical waveguide element by the emitted light.

2. The optical alignment device of claim 1, wherein a fixing case support part having a plate shape is provided at a lower portion of the element fixing case.

3. The optical alignment device of claim 1, wherein an opening is formed at a front surface of the element fixing case.

4. The optical alignment device of claim 3, wherein a display window formed of a transparent or semi-transparent material is selectively mounted in the opening.

5. The optical alignment device of claim 1, wherein a depth limiting part configured to limit an insertion depth of the optical element or the optical waveguide element is formed inside the element fixing case.

6. The optical alignment device of claim 5, further comprising a medium coated part formed at a lower portion of the depth limiting part and coated with a medium for absorbing reflected light and scattered light.

7. The optical alignment device of claim 1, wherein the light source uses light in a visible light range.

8. The optical alignment device of claim 1, wherein the light source uses infrared light.

9. The optical alignment device of claim 1, wherein the light source is mounted in the mounting space of the element fixing case as a fixed type light source or a movable type light source.

10. The optical alignment device of claim 1, wherein the light source obliquely emits light toward the lower side of the optical element or the optical waveguide element.

11. The optical alignment device of claim 1, wherein the light source is configured to supply power to the optical alignment device, and the light source includes an external light source configured to supply light in a visible light range, an emitter obliquely mounted in the element fixing case, and an optical fiber patch cable connecting the external light source to the emitter.

12. The optical alignment device of claim 1, wherein a plurality of the optical alignment devices are provided.

13. An optical alignment method comprising:
    inserting an optical element or an optical waveguide element into an element insertion hole formed in an element fixing case until a lower end of the optical element or the optical waveguide element makes contact with a depth limiting part;

adjusting an angle of an emitter of a light source mounted in the element fixing case such that light is emitted toward a core of the optical element or the optical waveguide element; and supplying power to an external light source constituting the light source such that light in a visible light range of the external light source is emitted toward a lower side of the optical element or the optical waveguide element through the emitter via an optical patch cable.

14. The optical alignment method of claim 13, further comprising checking light transmitted to the optical element or the optical waveguide element through the emitter and an operational state through a display window mounted in an opening of the element fixing case.

15. The optical alignment method of claim 14, further comprising adjusting a position of the optical element or the optical waveguide element or a position of the emitter when the position of the optical element or the optical waveguide element and the position of the emitter need to be adjusted.

16. The optical alignment method of claim 13, wherein a plurality of the element fixing cases, each having the emitter, are provided, and the external light source of the light source that supplies power to the emitters is provided as a single external light source such that light of the external light source is sequentially or simultaneously supplied to the emitters.

\* \* \* \* \*